United States Patent Office 3,565,885
Patented Feb. 23, 1971

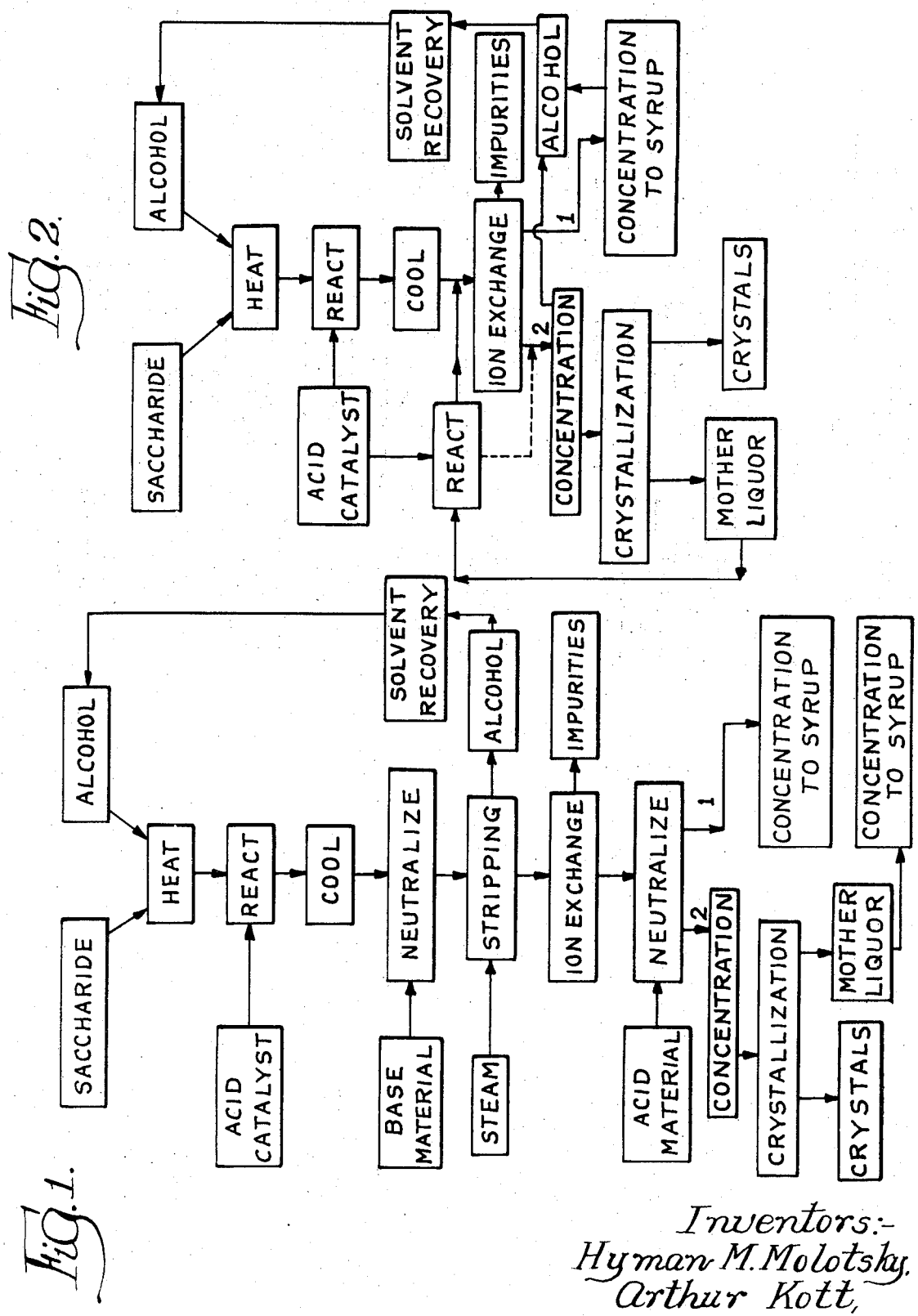

3,565,885
PREPARATION OF COLOR STABLE GLYCOSIDES
Hyman Max Molotsky, Chicago, and Arthur Kott, Oak Forest, Ill., assignors to CPC International Inc., a corporation of Delaware
Filed Oct. 10, 1968, Ser. No. 766,501
Int. Cl. C07c 47/18
U.S. Cl. 260—210     19 Claims

ABSTRACT OF THE DISCLOSURE

Processes for producing color stable glycosides are disclosed. The processes used may be divided into two separate types, (1) aqueous processes and (2) nonaqueous processes. The aqueous processes contemplated generally comprise dissolving a saccharide in an excess of alcohol and reacting these two ingredients in the presence of an acid catalyst at elevated temperatures to thereby form a crude glycoside-alcohol mixture. This mixture is then cooled and neutralized whereinafter the alcohol in the mixture is partially replaced by water. This water-glycoside mixture is then run through an anionic exchange resin of a selected type to remove substantially all of the reducing materials and other impurities therefrom to thereby yield an alkali color stable glycoside product.

The nonaqueous processes are conducted in substantially the same manner as the aqueous processes except that the alcohol in the mixture is not replaced by water. This product coming from the anion exchange resin may be directly crystallized to yield a color stable solid glycoside. The mother liquor from the crystallization step may be further processed to thereby achieve a more economic yield.

---

This invention relates to methods of producing alkali color stable glycosides. More specifically this invention relates to methods for producing glycosides which are substantially free of reducing materials that adversely color the glycosides.

Glycosides are well known useful materials in the art. Unfortunately their production has been fraught with many problems which have given rise to increased costs and products of diminished quality. One of the most perplexing of these problems has been the color instability of glycosides due to the presence therein of reducing materials such as reducing sugars which contain unreacted aldehyde groups. Elaborate and costly techniques have been devised to eliminate these materials and thereby increase the color stability of glycosides. Some of these techniques include such methods as oxidation, reduction, or fermentation of the reducing materials to remove them from the system, or crystallization of the glucoside away from the impurities. Not only have such techniques proved costly, but in many instances they render the glycoside liquors unsuitable for workup (crystallization) and for return to the process stream.

The problem of color instability of glycosides is particularly prevalent when glycosides known as glucosides are used to produce glucoside polyethers which are eventually used in the formation of polyurethane foams. Glucoside polyethers are generally produced by reacting a glucoside with an alkylene oxide in the presence of a strong inorganic base. If the glucoside used contains reducing materials such as reducing sugars having unreacted aldehyde groups therein, these reducing materials will decompose in the presence of the inorganic base to form compounds which adversely color the polyether formed by the reaction and thus color the resulting polyurethane foam into which the colored polyether is formed. It is therefore evident that a distinct need exists in the art for a process which can economically produce color stable glycosides. The term D.E. is an abbreviation for dextrose equivalent, and is used herein to refer to the reducing value of dissolved solids in a reaction mixture as measured by a modified Fehling's test (Fetzer, W. J., Analytical Chem. 24, 1129–1137 (1952) reference Nos. 37 to 41), and the results calculated as percent dextrose equivalent, dry basis.

The invention as contemplated herein provides various processes which economically produce color stable glycosides in either syrup or crystalline form.

The processes of this invention are generally of two separate types. The first type of process may be referred to as an aqueous process. That is to say, the term "aqueous" is used herein to signify that water is purposely and overtly added to the system during some stage of the process in order to replace at least a portion of unreacted alcohol. Such "aqueous" processes basically comprise reacting a saccharide with an excess of alcohol in the presence of an acid catalyst to thereby form a crude glycoside-alcohol mixture which includes at least one color unstable reducing material, replacing a substantial portion of the unreacted alcohol in the mixture with water, and contacting the crude glycoside mixture with an anion exchange resin selected from the group consisting of strongly basic anion exchange resins in their hydroxide form and weakly basic anion exchange resins in their hydroxide form other than phenol-formaldehyde based resins, to thereby yield a color stable glycoside.

The second type of process contemplated by this invention may be referred to as a nonaqueous process. That is to say, the term "nonaqueous" is used herein to signify that no water is purposely and overtly added to the system from an outside source in order to replace alcohol with water prior to purification. Basically, the nonaqueous processes of this invention comprise reacting a saccharide with an alcohol in the presence of an acid catalyst to thereby form a crude glycoside-alcohol mixture which includes at least one color unstable reducing material and contacting the crude glycoside-alcohol mixture with an anion exchange resin of the type described above with respect to the aqueous processes. Since the product so formed contains a very high alcohol to water ratio because no water was overtly added during the process, dry color stable glycosides are obtained by routine crystallization techniques.

FIG. 1 is a flow chart of one embodiment of an aqueous process as contemplated by this invention.

FIG. 2 is a flow chart of one embodiment of a nonaqueous process as contemplated by this invention.

As described above the present invention is useful for treating and upgrading glycoside products generally. Such products include glycosides and derivatives thereof. Of particular interest, however, are the glycosides known as glucosides and for this reason the following description shall refer primarily to glucosides, it being realized that the same general principles and procedures are also applicable to other glycosides as well.

Regardless of whether the above-described aqueous type of process or the nonaqueous type of process is used, the production of glycosides is basically effected by the reaction of a saccharide with an alcohol. Suitable saccharides useful in this invention for the production of glycosides include the well known monosaccharides, disaccharides, and polysaccharides. Examples of monosaccharides include the four different pentoses and the ten different hexoses. An example of a disaccharide is maltose, while examples of polysaccharides include starch and cellulose.

The alcohols useful in this invention for reacting with the above saccharides include both monohydric alcohols and polyhydric alcohols. Especially preferred monohydric alcohols are those which have 1 to 8 carbon atoms, examples of which include methyl alcohol, ethyl alcohol, propyl alcohol, isopropyl alcohol, butyl alcohol, amyl alcohol, 2-ethylhexyl alcohol and octyl alcohol. Suitable polyhydric alcohols include ethylene glycol, propylene glycol, butylene glycol, and glycerol.

Referring to FIG. 1 which illustrates an embodiment of the invention, color stable glucoside reaction products of the above saccharides and alcohols may be formed by an aqueous process which comprises initially forming a slurry of a saccharide and an alcohol. This may be done by simply adding an alcohol and a saccharide to a vessel and by agitation forming the desired slurry. This slurry is then heated under pressure with continued agitation for a sufficient period of time to dissolve the saccharide in the alcohol.

The relative proportions of saccharide to alcohol used may be varied over a wide range and will depend upon the individual ingredients employed. Preferably, an excess of alcohol over that which is necessary to dissolve and react with the saccharide is used in order to prevent the glucoside formed during the subsequent reaction from precipitating out of solution. As can be seen, such precipitation, if it should occur, necessitates the addition of further solvent later in the process in order to separate the glucoside from the reaction catalyst. Generally speaking molar ratios of alcohol to saccharide may range from as low as 3:1 to as high as 50:1 depending upon the system used. Ratios higher and lower than these limits may also be used in certain instances. An example of one preferred range is a low of 8.5:1 to a high of 45:1 when the saccharide is dextrose and the alcohol is methanol.

Since the reaction of a saccharide with an alcohol to form a glucoside in most instances is highly reversible, and since water is formed during the glucoside producing reaction, the presence of an appreciable amount of water in the reaction mixture tends to retard the production of glucoside. Consequently, anhydrous or substantially anhydrous starting materials are preferred. Anhydrous starting materials, however, are by no means mandatory since satisfactory results may be obtained using hydrates of saccharides which have as high as 8 percent moisture content. Such hydrates of saccharides are usually the commercially available forms of these compounds.

The choice of conditions used in dissolving the saccharide into the alcohol will vary as different ingredients are used. In a preferred form, for example, when dextrose is to be dissolved in methanol, the mixture is heated to about 220° F. at about 75 p.s.i.g. and held under these conditions until a solution is effected.

The solution formed by the above-described procedure is next placed in a suitable reaction vessel provided with a catalyst. Upon contact of the solution and the catalyst a reaction takes place between the saccharide and the alcohol to thereby yield a crude glucoside product, mixed, and preferably dissolved, in the excess of alcohol.

Although any conventional reaction vessel may be used to effect the above reaction, one convenient vessel is a static bed reactor in the form of a vertical pressurized chamber, which chamber is about ¾ filled with the catalyst when the catalyst is a resin.

Catalysts which may be used to effect a reaction between a saccharide and an alcohol for purposes of this invention are conventional catalysts in the art. Examples of these catalysts include strong mineral acids such as hydrochloric acid, sulfuric acid, phosphoric acid, and boron trifluoride; strong organic acids such as benzene sulfonic acid, toluene sulfonic acid, trichloroacetic acid, and oxalic acid; and strong cationic resins such as, for example, a sulfonated cross-linked polystyrene ion exchange resin in the acid form. In this respect, it has been found that when reacting polyols such as ethylene glycol and propylene glycol with a saccharide, the listed strong mineral acids and organic acids have proved very useful. The catalysts may be used in a wide variety of proportions differing for optimization according to the ingredients used.

The effluent which exits from the reaction vessel or chamber is primarily an acidic mixture of the desired glucoside, isomeric glucosides, glucosides of dimers, trimers and/or polymers of dextrose as well as color bodies, color producing bodies (e.g., reducing sugars, HMF) and other impurities in excess alcohol. This crude product is then cooled, preferably in a flash chamber to about 80–150° F., after which it is neutralized with a base such as $NH_4OH$ to a pH of about 5 or 6. The purpose of this neutralization step will be appreciated when the subsequent step of adding water is more fully disclosed. Since the reaction of saccharide and alcohol to glucoside and water is reversible in the presenec of an acidic catalyst, without the step of neutralization of the acid remaining from the initial reaction, subsequent addition of water would tend to cause at least some of the glucoside product to revert to saccharide an alcohol. By including the step of neutralization prior to the addition of water, this reversion is avoided.

The above neutralized crude product preferably in solution form is next stripped of excess alcohol by replacing the alcohol with water. It is the addition of water at this point in the process which causes this system to be designated as "aqueous."

The replacement of alcohol with water may be accomplished in any convenient and conventional manner. In a preferred form, the alcohol is replaced by running the neutralized crude product through a conventional stripping column where water is added and alcohol is removed by steam sparging. The stripped liquor containing the desired glucoside, color producing bodies (e.g., reducing sugars, etc.) other by products and water exits from the bottom of the stripping column. The alcohol is usually recovered from the top of the stripping column and may be dehydrated and reused in the initial slurry forming step.

The now aqueous liquor from the previous step is next brought into contact with an anion exchange resin selected from the group consisting of strongly basic anion exchange resins in their hydroxide form and weakly basic anion exchange resins in their hydroxide form other than phenolformaldehyde based resins. In this respect it has been found that weakly basic anion exchange resins of the phenolformaldehyde type are relatively ineffective when used for removing color producing bodies from the crude product mixture.

Resins of the above operative types are well known and conventional in the art, any one of which is useful in this invention. Examples of these resins which are especially preferred for use herein include Amberlite IRA-400, Amberlite IRA-401 and Amberlite IRA-401-S which are of the strongly basic, quaternary ammonium type anion exchange resin; and Amberlite IR-45, which is a weakly basic polystyrene based polyamine type anion exchange resin which is a mixture of secondary and tertiary amines (as the active sites), manufactured and sold by Rohm and Haas Company.

Although the neutralized liquor may be contacted by the anion exchange resin in a variety of ways, all of which are within the ingenuity of the skilled artisan once given the disclosure herein, a particularly perferred technique is to pass the liquor through a static bed ion exchange column. Any well known and conventional column may be used for this purpose.

It has been found that by employing an anion exchange resin of the above described type in this system, coloring bodies such as reducing sugars are effectively removed at this point in the process and the effluent issuing from the bottom of the exchange resin column is a colorless, color stable glucoside product in water.

Examples of reducing sugars which cause color instability in glucoside products include such sugars as glucose (dextrose), mannose, arabinose, xylose, galactose, fructose, and lactose. As can be seen, such sugars are usually present in the system because they were the initial saccharide used, a portion of them remaining unreacted after the glucoside reaction is terminated. Generally speaking, it is believed that the above reducing sugars are only one type of broad class of coloring bodies which are removed by the anion exchange resin that would otherwise cause coloring of the glucoside product. In this respect, it is believed that the broad class of coloring bodies which give rise to the problem of glucoside coloring and which are removed by contact with the above-described resins may be defined as alkali labile compounds. Such compounds are exemplified by the various ketoses and aldoses (which include the above reducing sugars). Ketoses and aldoses are compounds which contain unreacted aldehydic and ketonic groups, which groups are alkali labile. When these compounds are later used in processes having alkali environments such as in the production of polyethers and polyurethane foams, color producing bodies are formed which color and contaminate the final product. It is of course understood that such coloring bodies are not necessarily those present as unreacted starting materials, since it is quite conceivable that partially reacted coloring bodies and the like many also fit within the above described class of contaminants removed by contact with anion exchange resins.

As stated above, the product issuing from the static resin bed is a highly color-stable glucoside. At this point in the process the pH has risen to about 8 to 9 so it has been found beneficial, though not necessary, to neutralize the product with a trace of HCl usually to a pH of about 5 to about 6. Such a neutralization step insures that any hydroxide which was used to generate or regenerate the anion exchange resin into its OH− form and still remaining in the resin is neutralized so as not to contaminate the final product.

The neutralized color stable final product is then usually concentrated to a desired viscosity by simple evaporation. The resulting product, a total product, is marketable as a color stable glucoside syrup. This alkali stable product contains glucosides of dextrose and of dextrose dimers, trimers and polymers.

Alternatively, the syrup may be further concentrated and seeded to crystallize for example the methyl α-D-glucoside from the syrup. The alternates are shown in FIG. 1 denoting the syrup formation as numeral 1 and the crystallizing technique as numeral 2. The methyl α-D-glucoside and the resulting mother liquor are both alkali stable and can be used in preparation of polyethers, urethane foams, extenders for epoxy resins, plasticizers, surfactants, etc.

The above-described aqueous process sets forth one preferred mode of making color stable glucosides by using an aqueous technique. Once given the above teachings, many modifications become apparent. For example, the initial agitation vessel need not be a separate vessel from the reaction vessel. Rather, they may be one and the same container. In another instance, the mixture of alcohol and saccharide may be formed in situ with the catalyst already being present. This may be effected, for example, by initially mixing the alcohol and catalyst and then adding the saccharide to this mixture. In still another instance, the substitution of water for alcohol need not be done by steam sparging in a separate column. Rather, this substitution may be accomplished by initially vacuum stripping a substantial portion of the aclohol from the system and then diluting the resulting product with water. After the reaction has taken place, according to another modification, the product may be cooled within the reaction vessel itself rather than by a separate flash cooling technique. This may be accomplished, for example, by providing the reaction vessel with an external cooling jacket or similar deivce.

Regardless of whether the initially set forth procedure is used or the procedure is modified by one or more of the above indicated ways, it has been found that the product produced has the economic advantage of being a total product which requires little or no further treatment to render it color stable and marketable.

In a typical example of an aqueous technique, a mixture of 3.8 parts by weight of propylene glycol and 0.03 part by weight concentrated sulfuric acid is agitated and heated to 110°–120° C. 1.0 part by weight of dextrose is then added to this mixture and the reaction temperature is maintained at 115°–120° C. for 30 minutes at atmospheric pressure and one hour at reduced pressure (100 mm.). The reaction mixture which includes propylene glycol glucoside as the major constituent, and color producing bodies in excess propylene glycol is then cooled to a temperature of about 105° C., at which temperature the excess propylene glycol is vacuum stripped from the mixture. The stripped product is then further cooled, diluted with water in an amount approximately equal to the amount of glycol removed, and the pH is adjusted with $NH_4OH$ to a level of 6. The resulting neutralized crude product is then passed through a 4′ high static bed of Amberlite IRA–401S–OH−. The effluent is neutralized with a trace of HCl to a pH of about 6 and concentrated by evaporation of water to a thick syrup. This syrup is found to be a color stable, marketable propylene glycol glucoside product useful in the production of polyethers for polyurethane foams.

Although the above-described aqueous processes have proved very useful in upgrading glycosides to extremely color stable syrups, it has been found that equally good color stability characteristics can be achieved by a unique nonaqueous type of process also contemplated as part of this invention. The nonaqueous processes as contemplated by this invention generally comprise reacting a saccharide with an excess of alcohol in the presence of a catalyst to thereby form a crude glycoside-alcohol mixture in the same manner and with the same possible modification as described above with respect to the aqueous processes of this invention. That is to say, and referring primarily to FIG. 2, a glucoside (or glycoside)-alcohol mixture is first formulated by the same techniques as described above with respect to the aqueous processes. Then, instead of neutralizing the crude product and replacing a substantial portion of the excess alcohol with water, these steps are omitted and the glucoside-alcohol mixture is sent directly through the anion exchange resin as described above either with or without removal of some of the excess alcohol prior to contact with the resin, whereby coloring bodies as described hereinabove are effectively removed.

Two possible avenues of treatment are now available in order to put the color stable, glucoside product in final form. As illustrated in FIG. 2 at numeral 1, this glucoside product may be concentrated to a syrup as by evaporation whereinafter it is collected and marketed as a total product. In this respect, the syrup may be an alcohol syrup or the glycoside can be further processed in a manner as described above to replace the alcohol with water and thereby render the final product an aqueous syrup. The mother liquor may be recycled, as shown, to second reaction station, after which the reacted recycle reenters the main process stream at either the ion exchange resin point or after the ion exchange resin point. Numeral 2 of FIG. 2 illustrates that the glucoside product, instead of being formed into a total product, may be crystallized by conventional techniques such as concentration by evaporation and seeding to precipitate the color stable glucoside crystals and centrifuged to separate the crystals from the mother liquor. The crystals may then be dried and collected as a final product.

The motor liquor may be recycled to an appropriate point in the process. In the preparation of methyl glucosides, it has been found that the alpha glucoside precipitates more readily than the beta glucoside. Thus, after crystallization, the mother liquor contains a large portion of beta glucoside and "equilibration" of the alpha and beta forms by known techniques such as acid treatment permits more than one crop of crystals to be obtained from one solution.

In either process, wherein crystallization is effected and a mother liquor remains, recycling of the mother liquor provides a highly efficient system allowing almost complete recovery of the glucoside values as color stable glucoside.

Attendant advantages of each process as compared to the other are apparent. For example, in the preparation of crystalline glucoside the nonaqueous process eliminates the necessity for the removal of water. On the other hand, the preparation of a concentrated syrup is more readily achieved from the aqueous process.

In preparation on a commercial scale wherein orders have been placed for both the crystalline form and the aqueous syrup, it is only necessary to use one process inasmuch as either process is adaptable for preparation of crystalline material or an aqueous syrup.

Various modifications of the processes are apparent. For example, after formation of the crude glucoside mixture, it has been found advantageous to pass the crude glucoside solution through a granular carbon bed to remove color already present in the glucoside liquor. Such color is normally present in the crude glucoside mixture from the reaction and this color is not alkali-labile. It is conventional in the formation of a glucoside to treat the crude mixture with a granular carbon bed in order to remove the attendant light color formed during reaction. Such granular carbon treatment does not lend stability against subsequent color formation by the color bodies associated with the reducing sugars as discussed above.

The following examples illustrate the practice of the invention. All percentages are by weight and all temperatures in degrees Fahrenheit unless otherwise specified.

EXAMPLE 1

A Blaw-Knox kettle was charged with 290 lb. propylene glycol and 1.06 lbs. 66° Bé. sulfuric acid. The mixture was heated to 248° F. and 76 lbs. of anhydrous dextrose was added over a period of 2 minutes. The kettle was closed and reheated to 248° F. The mixture was held at this temperature for 30 minutes, cooled to 220° F., and held for 1 hr. at this temperature under a vacuum of 26 inches Hg. The vapors formed were condensed and collected. The vacuum was then increased to a maximum and the temperature raised to 248° F., and the reacting mixture held at this temperature for 2 hours. The kettle was then cooled to 80° F. with jacket cooling water. The reaction yielded 303 pounds of product and 64.5 pounds of vapor condensate. Upon analysis it was found that the reaction product had a dry substance of 99.4 pounds. A regenerated 6 cubic-foot resin bed column of Amberlite IRA–401S·OH⁻ resin was rinsed of excess hydroxide and the reaction product was fed to the top of the resin column. The effluent exiting from the bottom of the resin column yielded 108 gallons of product having a dry substance of 84 pounds. The resin bed was regenerated for the next operation with 120 gallons of 5 percent aqueous sodium hydroxide solution and rinsed to remove excess hydroxide with dimineralized water for 2 and ½ hours.

The effluent product from the resin column was next stripped of solvent (unreacted alcohol) by evaporating it in a Rodney Hunt Turba-Film Evaporator to a final syrup of 82 pounds containing a dry substance of 79.4 lbs. The term d.s. is used herein to describe the amount of glucoside on a dry basis obtained. In this instance although several glucosides are present propylene glycol glucoside is the primary glucoside formed.

Product analysis of the final syrup reveals the following characteristics.

Table 1

Glucoside, dry substance—95.2%
Color—essentially colorless
D.E.—0.01
Water—0.6%
Propylene glycol—4.7%
Ash (sulfated)—0.03%
Alkali stability—no discernible color formed To test for alkali stability, water is added to the glucoside substance and the reactant solvent removed by concentration to a 50% solution. 20 milliliters of the solution are boiled in the presence of two pellets of potassium hydroxide for a period of one minute and allowed to cool for 10 minutes. Any color developed is observed or measured. In each case after treatment in accordance with the present invention, essentially no color developed and the product was rated as having good alkali stability.

A sample of the crude glucoside mixture after treatment with granular carbon only was subjected to the alkali stability test. Upon boiling, the solution became very dark in color, thus indicating poor alkali stability.

As is clearly seen the resulting syrup contains substantially no color producing bodies and is very color and alkali stable. Such a product may be readily used in conventional techniques for producing polyethers useful in making polyurethane foams, as extenders for epoxy resins, surfactants, etc.

EXAMPLE 2

A Blaw-Knox kettle was charged with 290 lbs. propylene glycol and 1.08 lbs. 66° Bé. sulfuric acid. The mixture was heated to 194° F. and 76 lbs. of predried corn starch were added over a 2-minute period. The kettle was closed and heated for 1 hr. at 284° F. at which time it was cooled to 220° F. and held at this temperature for 2 hours under a vacuum of 28.5 inches Hg. The reaction mixture was then cooled to 80° F. with jacket cooling water. The reaction yielded 338 lbs. of product and 31.5 lbs. of vapor condensate. The product had a d.s. of 114 lbs.

A 6-cubic foot resin bed of Amberlite IRA–401S was regenerated with NaOH as described above and rinsed of excess hydroxide with H₂O. The reaction product was then passed through this bed and solvent stripped by a technique as described in Example 1. The effluent yielded 92 lbs. of product (propylene glycol glucoside) having a d.s. of 87.2 lbs. Product analysis was found to be as follows:

Table 2

Dry substance—96.5%
Color—essentially colorless
D.E.—0.05
Propylene glycol, percent as is—5.2
Ash (sulfated)—0.5%
Alkali stability—no discernible color formed

EXAMPLE 3

Dextrose was slurried in excess methanol and reacted in the presence of an acid catalyst for 6–10 hours to form a crude methyl glucoside solution. The crude methyl glucoside mixture was cooled and the excess methanol vacuum stripped from the mixture. The stripped product was then diluted with water in an amount approximately equal to the amount of methanol removed. The pH was adjusted to a level of 6 with ammonium hydroxide and the resulting neutralized crude product passed through a 4' static bed of Amberlite IRA–400. The solution was concentrated by evaporation of water to a thick syrup. The syrup product had a D.E. of 0.1 and contained methyl glucoside in the amount of about 75% of the total glucoside content. The remaining material consisted of glucosides of dimer, trimer and other polymers of dextrose.

In a similar example the total methyl glucoside aqueous solution was treated over Amberlite IR–45 at an elevated temperature (65° C.) The concentrated syrup was color stable and suitable for use in preparation of polyethers.

This syrup was found to be a color stable marketable methyl glucoside product useful in the production of polyethers and as a plasticizer, surfactant, or the like.

EXAMPLE 4

A crude methyl glucoside solution was formed as in Example 3 but in this example no water was added. Instead, the reaction mixture was cooled to 80° F. with jacket cooling water. The crude solution was then passed through a 6 cubic foot resin bed of Amberlite IRA–401S. The resin treated solution was then solvent stripped by the technique described in Example 1. The final product had a dry substance of 96.5% and a D.E. of 0.05. The product was essentially colorless and the color remained stable upon treatment with alkali in solution at an elevated temperature. The product was found to be very suitable for the uses outlined above.

Other glucoside products were prepared in the same manner only using different starting materials. For instance, in the same manner, dextrose was reacted in an excess of anhydrous ethanol in the presence of an acid catalyst to form a crude ethyl glucoside solution. A portion of the solution was processed in accordance with Example 3, i.e. the aqueous process, to yield a syrup of color stable ethyl glucoside. Another portion of the crude solution was treated in accordance with Example 4, i.e., the nonaqueous process, to provide crystalline ethyl glucoside of exceptional color stable characteristics.

Other samples of alkyl glucosides such as propyl glucosides and butyl glucosides were also prepared with the same degree of success in achieving alkali color stability.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. In a process for preparing color stable glycosides by reacting a saccharide with an alcohol selected from the group consisting of mono-lower alkyl alcohols, poly-lower alkyl alcohols and lower alkylene alcohols, in the presence of a catayst to thereby form a crude glycoside-alcohol mixture which includes at least one color-producing material, the improvement which comprises:
   replacing at least a portion of the unreacted alcohol in said mixture with water; and
   contacting said crude glycoside mixture with an anion exchange resin selected from the group consisting of strongly basic anion exchange resins in their hydroxide form and weakly basic anion exchange resins in their hydroxide form other than phenol-formaldehyde based resins, to thereby yield a color stable glycoside.

2. A process according to claim 1, wherein said glycoside is a glucoside selected from the group consisting of methyl glucoside, ethyl glucoside, propyl glucoside, butyl glucoside, and propylene glycol glucoside.

3. A process according to claim 1, which also includes the step of concentrating the color stable glycoside after its contact with the anion exchange resin to a syrup.

4. A process according to claim 1, wherein the saccharide is reacted with the alcohol in the presence of an excess of alcohol over that which is necessary to dissolve and react with the saccharide, said excess of alcohol being sufficient to prevent any substantial amount of the glycoside formed during the reaction from precipitating out of solution.

5. A process according to claim 1, wherein the molar ratio of alcohol to saccharide prior to reaction thereof is from about 3:1 to about 50:1.

6. In a process for preparing a color stable glycoside by forming a slurry of an alcohol selected from the group consisting of mono-lower alkyl alcohols, poly-lower alkyl alcohols and lower alkylene alcohols, and a saccharide, forming a solution of the slurry by heating said slurry to dissolve said saccharide in said alcohol, reacting said solution in the presence of a catalyst to produce a crude glycoside product containing at least one color producing contaminant, the improvement which comprises:
   cooling said glycoside product;
   neutralizing said product to a pH from about 5 to about 6;
   replacing at least a portion of the unreacted alcohol remaining in the crude product with water to thereby form a substantially neutral aqueous liquor of said crude product; and
   contacting said liquor with an anion exchange resin selected from the group consisting of strongly basic anion exchange resins in their hydroxide form and weakly basic anion exchange resins in their hydroxide form other than phenol-formaldehyde based resins, to thereby remove at least a portion of said color producing contaminant.

7. A process according to claim 6, wherein the alcohol is selected from the group consisting of ethylene glycol, propylene glycol, ethanol and methanol.

8. A process according to claim 6, wherein the glycoside is a glucoside selected from the group consisting of methyl glucoside, ethyl glucoside, isopropyl glucoside, propyl glucoside, butyl glucoside, and propylene glycol glucoside.

9. A process according to claim 6, which also includes the step of concentrating the color stable glycoside after its contact with the anion exchange resin to a syrup.

10. A process according to claim 6, wherein the molar ratio of alcohol to the saccharide prior to reaction thereof is from about 3:1 to about 50:1.

11. A process according to claim 6, wherein the steps of forming the slurry, dissolving the saccharide in the alcohol, and reacting said saccharide with said alcohol, are carried out in the same container.

12. A process according to claim 6, wherein said alcohol is replaced by water by sparging the crude glycoside product with steam.

13. A process according to claim 12, wherein said replaced alcohol is recovered and recycled for use in forming said slurry.

14. A process according to claim 6, wherein said alcohol is replaced by water by vacuum stripping said alcohol from said product and then diluting said product with water.

15. In a process for preparing color stable glycosides by reacting a saccharide with an alcohol selected from the group consisting of mono-lower alkyl alcohol, poly-lower alkyl alcohols and lower alkylene alcohols, in the presence of a catalyst to thereby form a crude glycoside-alcohol mixture which includes at least one color producing material, the improvement which comprises:
   cooling the crude glycoside alcohol mixture to a temperature from about 80° F. to about 150° F.;
   contacting said crude glycoside product with an anion exchange resin selected from the group consisting of strongly basic anion exchange resins in their hydroxide form and weakly basic anion exchange resins in their hydroxide form other than phenol-formaldehyde based resins; and
   recovering a color stable glycoside product.

16. A process according to claim 15, wherein the alcohol is selected from the group consisting of ethylene glycol, propylene glycol, methanol and ethanol.

17. A process according to claim 15, which also includes the steps of crystallizing the color stable glycoside in said product and separating said crystals from their mother liquor.

18. A process according to claim 17, wherein said mother liquor is recycled to an appropriate point in the process.

19. A process according to claim 15, wherein the saccharide is reacted with the alcohol in the presence of an excess of alcohol over that which is necessary to dissolve and react with the saccharide, said excess of alcohol being sufficient to prevent any substantial amount of the glycoside formed during the reaction from precipitating out of solution.

References Cited

UNITED STATES PATENTS

| | | | |
|---|---|---|---|
| 3,240,775 | 3/1966 | Schweiger | 260—210 |
| 3,375,243 | 3/1968 | Nevin et al. | 260—210 |
| 3,450,690 | 6/1969 | Gibbons | 260—210 |

LEWIS GOTTS, Primary Examiner

J. R. BROWN, Assistant Examiner

Dedication 3,565,885.—*Hyman Max Molotsky*, Chicago, and *Arthur Kott*, Oak Forest, Ill. PREPARATION OF COLOR STABLE GLYCOSIDES. Patent dated Feb. 23, 1971. Dedication filed June 10, 1976, by the assignee, *CPC International Inc.*

Hereby dedicates to the Public the entire term of said patent.

[*Official Gazette August 10, 1976.*]